United States Patent
Hirao

(10) Patent No.: US 10,128,728 B2
(45) Date of Patent: Nov. 13, 2018

(54) MANUFACTURING METHOD FOR SEGMENT COIL

(71) Applicant: TOYOTA JIDOSHA KABUSHIKI KAISHA, Toyota-shi (JP)

(72) Inventor: Yasuyuki Hirao, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 634 days.

(21) Appl. No.: 14/801,171

(22) Filed: Jul. 16, 2015

(65) Prior Publication Data

US 2016/0028294 A1  Jan. 28, 2016

(30) Foreign Application Priority Data

Jul. 23, 2014 (JP) .................................. 2014-149671

(51) Int. Cl.
*B23K 11/00* (2006.01)
*H02K 15/04* (2006.01)

(52) U.S. Cl.
CPC ................................ *H02K 15/0414* (2013.01)

(58) Field of Classification Search
CPC ........ H05B 6/36; H02K 15/04; H02K 15/014; B23K 11/00; B23K 11/026
USPC .... 219/117.1, 85.18, 85.19, 85.22, 603, 605, 219/672
See application file for complete search history.

(56) References Cited

U.S. PATENT DOCUMENTS

| | | | | |
|---|---|---|---|---|
| 3,187,495 A | * | 6/1965 | Christian, Jr. | ..... H01B 13/0257 174/113 R |
| 3,422,648 A | * | 1/1969 | Lemelson | ............. B21C 23/085 264/171.12 |
| 3,635,007 A | * | 1/1972 | Yoshida | .................... D07B 3/00 57/314 |
| 5,787,567 A | | 8/1998 | Miyazaki | |
| 6,649,844 B2 | * | 11/2003 | Kusumoto | ............... H02K 3/12 174/128.1 |
| 6,735,847 B2 | * | 5/2004 | Roberts | .................. H02K 15/04 29/596 |
| 6,881,194 B2 | * | 4/2005 | Miyata | ................. A61B 5/6851 600/585 |
| 6,952,541 B2 | * | 10/2005 | Fujimori | .............. G03G 15/205 219/216 |

(Continued)

FOREIGN PATENT DOCUMENTS

| | | |
|---|---|---|
| CN | 1136232 A | 11/1996 |
| CN | 101607343 A | 12/2009 |

(Continued)

*Primary Examiner* — Dana Ross
*Assistant Examiner* — Ayub Maye
(74) *Attorney, Agent, or Firm* — Oblon, McClelland, Maier & Neustadt, L.L.P.

(57) ABSTRACT

A manufacturing method for a segment coil according to the invention includes forming an assembled wire by bundling a plurality of element wires, forming a stranded wire by twisting the assembled wire, forming a rectangular conductor by rolling the stranded wire, and forming a segment coil by cutting the rectangular conductor into a given length and bending the cut rectangular conductor. Before the rectangular conductor is bent, the plurality of element wires is fastened at a position where the coil end portion of the segment coil is formed.

7 Claims, 12 Drawing Sheets

(56) References Cited

U.S. PATENT DOCUMENTS

| | | | | |
|---|---|---|---|---|
| 2008/0007133 | A1* | 1/2008 | Onimaru | H02K 3/14 |
| | | | | 310/208 |
| 2009/0315419 | A1 | 12/2009 | Mita et al. | |
| 2012/0092117 | A1* | 4/2012 | Urano | H02K 3/42 |
| | | | | 336/186 |
| 2014/0159538 | A1* | 6/2014 | Hasegawa | H02K 3/345 |
| | | | | 310/215 |

FOREIGN PATENT DOCUMENTS

| | | |
|---|---|---|
| CN | 103326482 A | 9/2013 |
| CN | 103855835 A | 6/2014 |
| JP | 2004-64825 A | 2/2004 |
| JP | 2009-199749 | 9/2009 |
| JP | 2012-205344 | 10/2012 |
| JP | 2013-236523 A | 11/2013 |
| JP | 2014-212052 | 11/2014 |
| WO | WO 2014/170739 A1 | 10/2014 |

* cited by examiner

MANUFACTURING METHOD FOR SEGMENT COIL

INCORPORATION BY REFERENCE

The disclosure of Japanese Patent Application No. 2014-149671 filed on Jul. 23, 2014 including the specification, drawings and abstract is incorporated herein by reference in its entirety.

BACKGROUND OF THE INVENTION

1. Field of the Invention

The invention relates to a manufacturing method for a segment coil.

2. Description of Related Art

In recent years, a motor has been widely used, which uses segment coils as coils that structure a stator of the motor. In the motor using the segment coils, it is possible to improve a space factor of a slot effectively, thereby realizing size reduction, high performance, and high output of the motor.

Japanese Patent Application Publication No. 2009-199749 (JP 2009-199749 A) discloses a technique regarding a manufacturing method for an assembled conductor. In the technique disclosed in JP 2009-199749 A, a plurality of element wires are stranded together to form a stranded wire, and thereafter, the stranded wire is compression-molded by using a forming die, thereby forming a rectangular conductor in which the stranded wire has a rectangular section. Then, an outer periphery of the rectangular conductor is covered by using an insulating material such as a resin material so that an insulation layer is formed. Thus, an assembled conductor is formed.

In a case where segment coils are used as coils that structure a stator of a motor, a plurality of U-shaped segment coils are arrayed into a circular shape in a stator core, and the plurality of segment coils are electrically connected with each other. At this time, since a plurality of coil end portions of the segment coils are connected with each other by welding and so on, it is necessary to bend the segment coils so that the plurality of coil end portions come close to each other.

However, because the segment coils are coils that are formed by assembling a plurality of element wires (conductors), the element wires in the coil end portions come apart when the segment coils are bent, and it could thus be difficult to connect the plurality of coil end portions with each other by welding and so on.

SUMMARY OF THE INVENTION

An aspect of the invention provides a manufacturing method for a segment coil, by which element wires in a coil end portion are prevented from coming apart.

A manufacturing method for a segment coil according to an aspect of the invention includes forming an assembled wire by bundling a plurality of element wires, forming a stranded wire by twisting the assembled wire, forming a rectangular conductor by rolling the stranded wire, and forming a segment coil by cutting the rectangular conductor into a given length and bending the cut rectangular conductor. The plurality of element wires is fastened at a position where a coil end portion of the segment coil is formed before bending the rectangular conductor.

In the manufacturing method for a segment coil in the aspect of the invention, the plurality of element wires is fastened at the position where the coil end portion of the segment coil is formed, before the segment coil is formed by bending the rectangular conductor. Therefore, even when the rectangular conductor is bent, it is possible to prevent the element wires in the coil end portion from coming apart.

According to the aspect of the invention, it is possible to provide the manufacturing method for a segment coil, by which the element wires in the coil end portion are prevented from coming apart.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
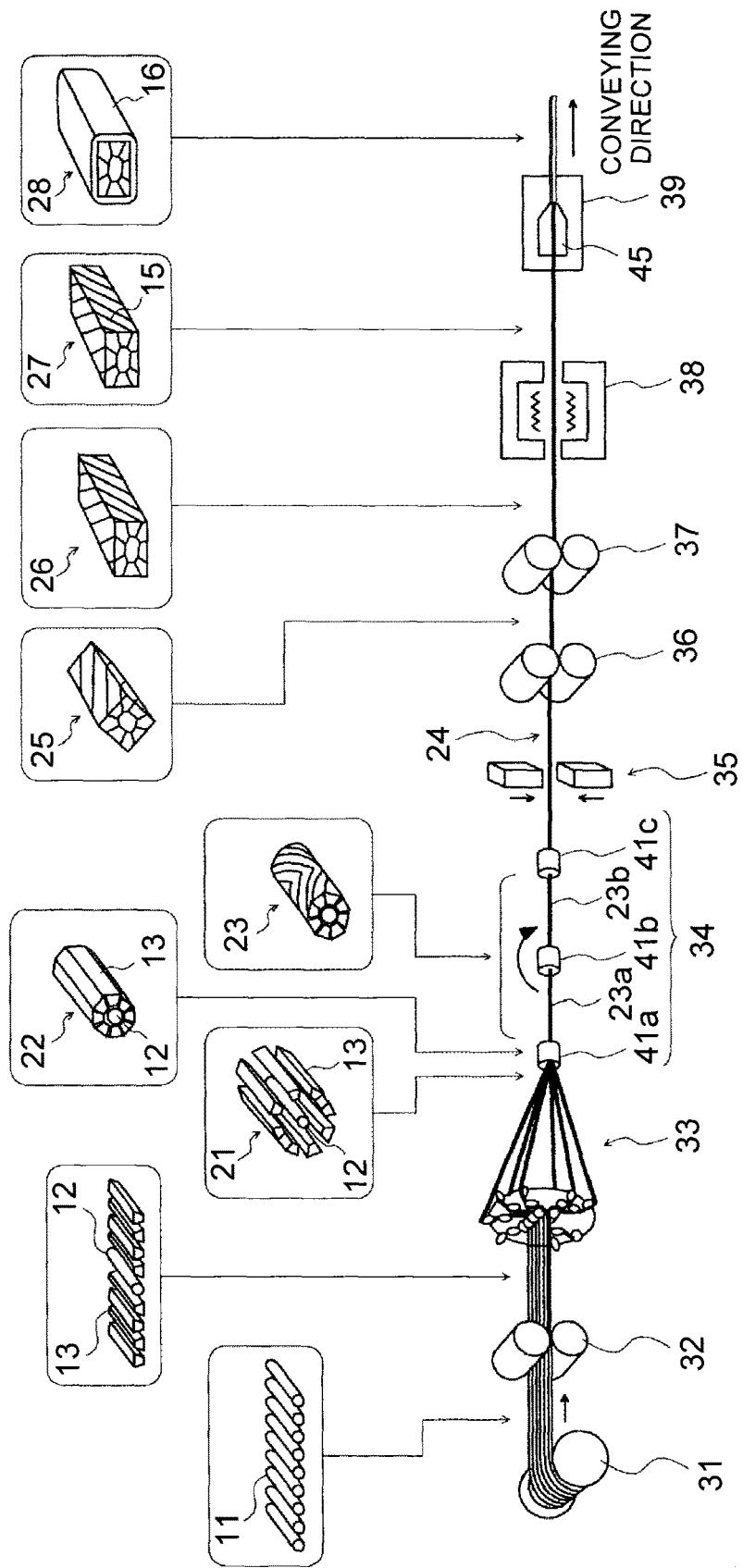
FIG. 1 is a view for explaining a manufacturing method for a segment coil according to an embodiment.
Figure 2:
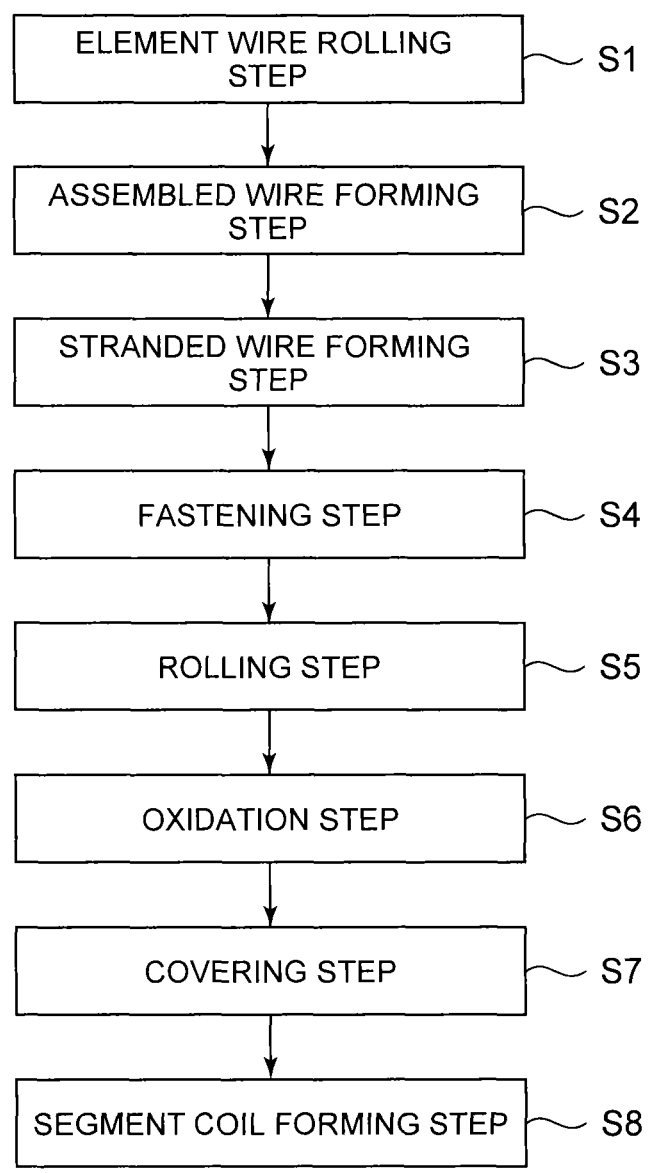
FIG. 2 is a flowchart for explaining the manufacturing method for a segment coil according to the embodiment.
Figure 8:
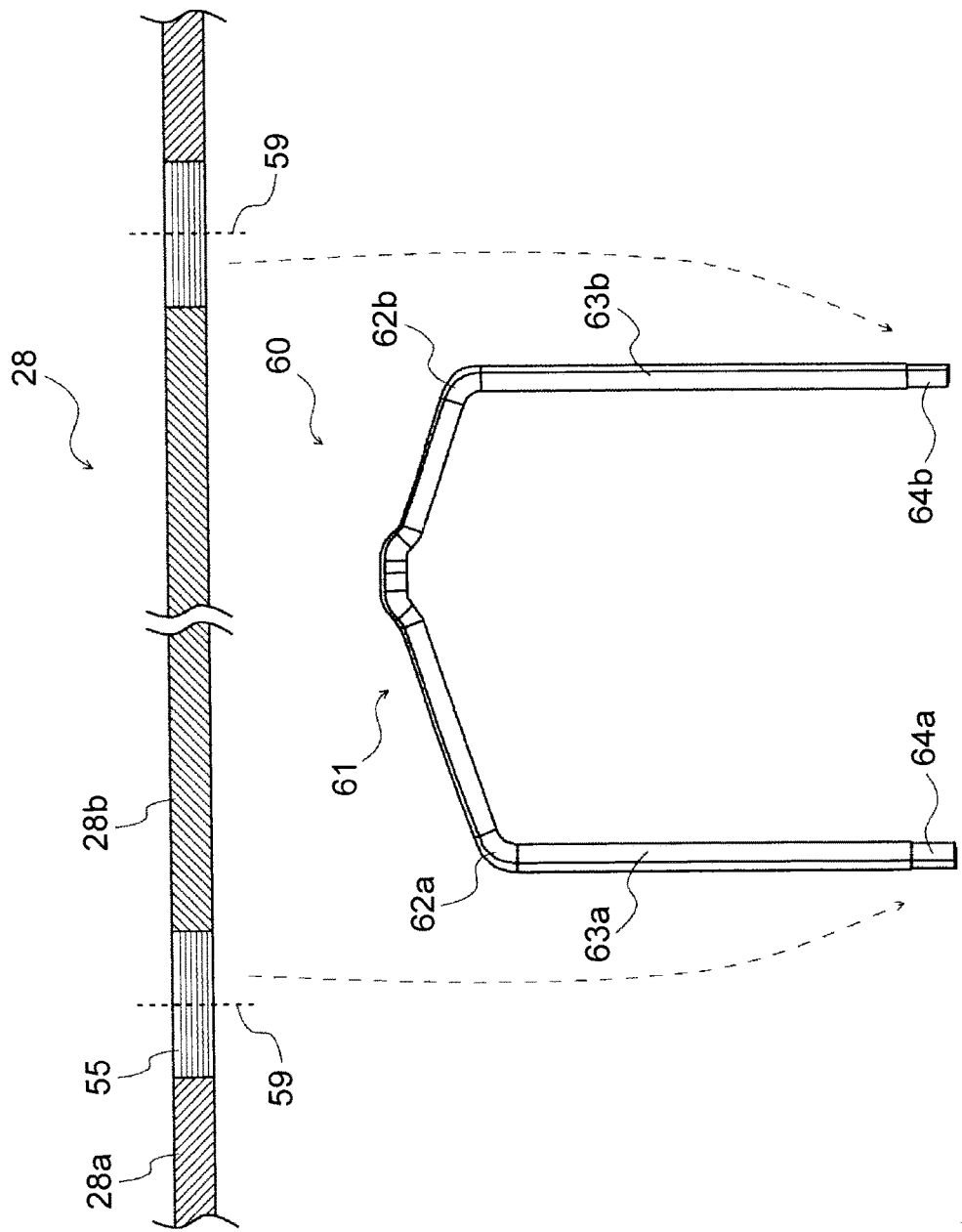
FIG. 8 is a view for explaining a segment coil forming step.

An embodiment of the invention is explained below with reference to the drawings. FIG. 1 is a view for explaining a manufacturing method for a segment coil according to the embodiment. FIG. 2 is a flowchart for explaining the manufacturing method for a segment coil according to the embodiment. As shown in FIG. 2, the manufacturing method for a segment coil according to the embodiment includes an element wire rolling step (S1), an assembled wire forming step (S2), a stranded wire forming step (S3), a fastening step (S4), a rolling step (S5), an oxidation step (S6), a covering step (S7), and a segment coil forming step (S8). In this embodiment, a rectangular conductor 28 is formed by assembling a plurality of element wires 11 shown in FIG. 1, and then the rectangular conductor 28 is cut and bent. Thus, a segment coil 60 shown in FIG. 8 is formed. Each of the steps is explained in detail below.

As shown in FIG. 1, an element wire feeder 31 feeds the plurality of element wires 11 to rolling mill rolls 32. The plurality of element wires 11 fed by the element wire feeder 31 is rolled by using the rolling mill rolls 32 (step S1). This means that rolling of the element wires 11 by using the rolling mill rolls 32 forms peripheral element wires 13 having trapezoidal sections. The rolled peripheral element wires 13 are fed to direction adjusting rollers 33. At this time, a central element wire 12 having a circular sectional shape is fed to the direction adjusting rollers 33 without being rolled by the rolling mill rolls 32. Each of the element wires 11 may be structured by using a metallic material such as copper.

The direction adjusting rollers 33 adjust directions of the central element wire 12 and each of the peripheral element wires 13 so that the central element wire 12 and each of the peripheral element wires 13 are in a positional relation shown in the figure of an assembled wire 21. Thereafter, the central element wire 12 and each of the peripheral element wires 13, directions of which are adjusted, are bundled together, thereby forming an assembled wire 21 (step S2). In short, the direction adjusting rollers 33 arrange the central element wire 12 in the center of the assembled wire 21, and arrange each of the peripheral element wires 13 around the central element wire 12. At this time, the direction adjusting rollers 33 arrange each of the peripheral element wires 13 around the central element wire 12 so that an upper base of a trapezoidal section of each of the peripheral element wires 13 faces the element wire 12 side (in other words, a lower base of the trapezoidal section of each of the peripheral element wires 13 is located on the outer side of the assembled wire 21).

This embodiment shows a case as an example where the number of the central element wire 12 is one, and the number of the peripheral element wires 13 is eight. However, the number of the central element wire 12 and the number of peripheral element wires 13 may be different numbers.

Thereafter, the assembled wire 21 is fed to a twisting mechanism 34. The twisting mechanism 34 twists the assembled wire 21, which has been fed, thereby forming a stranded wire 23 (step S3). When forming the stranded wire 23, the twisting mechanism 34 grips the assembled wire 21 at three locations that are separated from each other in a central axis direction (a conveying direction) by using gripping portions 41a to 41c, and then rotates the gripping portion 41b in the middle among gripping portions 41a to 41c about the central axis of the assembled wire 21. Thus, it is possible to form the stranded wire 23 having a left-winding portion 23a and a right-winding portion 23b.

This means that, by twisting the assembled wire 21 by using the gripping portion 41b in a counterclockwise direction in a view from a downstream side of the conveying direction, it is possible to form the left-winding portion 23a and the right-winding portion 23b, made by the twisted assembled wire 21. The left-winding portion 23a is twisted in the counterclockwise direction in a view from the downstream side of the conveying direction. The right-winding portion 23b is twisted in a clockwise direction in a view from the downstream side of the conveying direction (see FIG. 3).

In the locations gripped by the gripping portions 41a to 41c (parallel portions 22), since the assembled wire 21 is not twisted, the central element wire 12 and each of the peripheral element wires 13 are parallel to each other. For example, in the stranded wire 23 shown in FIG. 3, the parallel portions 22a, 22b, 22c correspond to the locations gripped by the gripping portions 41a, 41b, 41c, respectively. In this specification, the parallel portions 22a, 22b, 22c are sometimes collectively referred to as parallel portions 22.

FIG. 1 shows the case where the assembled wire 21 is twisted by using the gripping portion 41b in the counterclockwise direction in the view from the downstream side of the conveying direction. However, the direction for twisting the assembled wire 21 by using the gripping portion 41b may be opposite (in other words, the clockwise direction in the view from the downstream side of the conveying direction).

Figure 3:
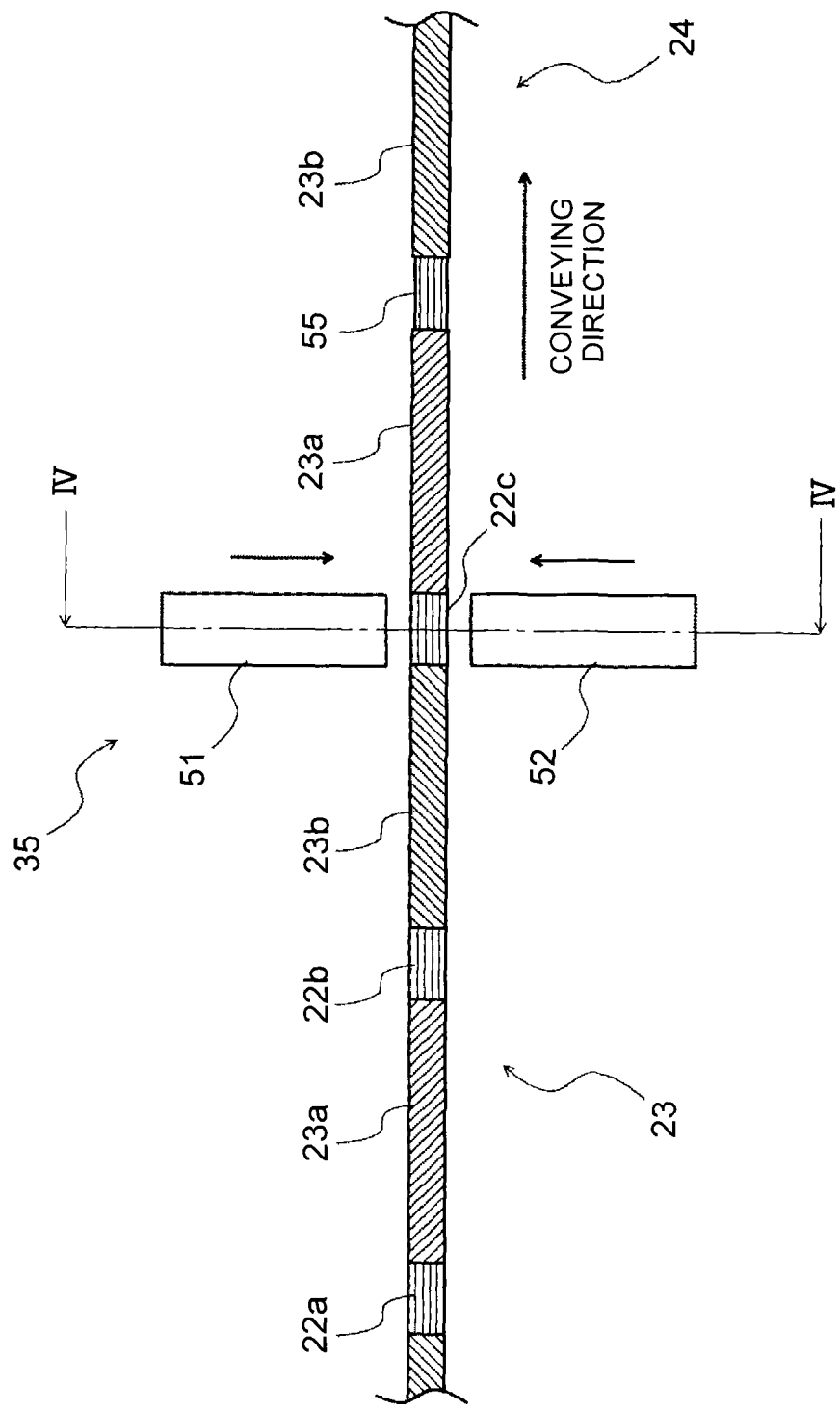
FIG. 3 is a side view for explaining a fastening step in the manufacturing method for a segment coil according to the embodiment.
Figure 4:
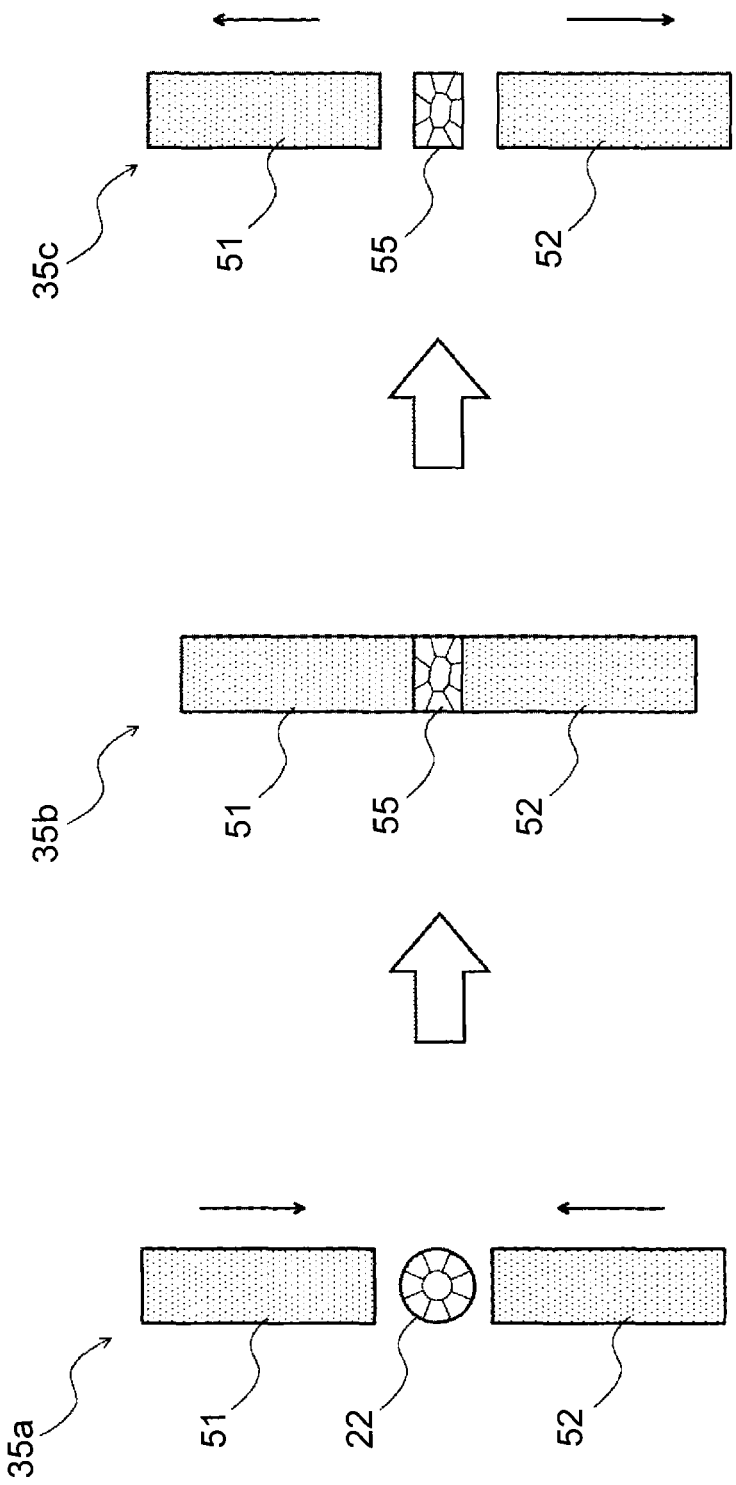
FIG. 4 is a sectional view taken along the cutting line IV-IV in FIG. 3.

The stranded wire 23 formed at the twisting mechanism 34 is fed to a fastening mechanism 35. The fastening mechanism 35 fastens the plurality of element wires (in other words, the central element wire 12 and each of the peripheral element wires 13) in the parallel portions 22 of the stranded wire 23 (step S4). FIG. 3 is a side view for explaining the fastening step. FIG. 4 is a sectional view taken along with the cutting line IV-IV in FIG. 3. As shown in FIG. 3 and FIG. 4, the fastening mechanism 35 may be structured by, for example, a heat caulking device having an upper electrode 51 and a lower electrode 52.

When the parallel portion 22 of the stranded wire 23 is arranged at a position sandwiched between the upper electrode 51 and the lower electrode 52, the fastening mechanism 35 sandwiches the parallel portion 22 using the upper electrode 51 and the lower electrode 52 (shown by reference numeral 35a in FIG. 4). Thereafter, an electric current is flown between the upper electrode 51 and the lower electrode 52, and further, the upper electrode 51 and the lower electrode 52 are used to press the parallel portion 22. Thus, a part of the parallel portion 22 is melted, and the plurality of element wires is fastened, thereby forming a fastened portion 55 (see reference numeral 35b in FIG. 4). Thereafter, the upper electrode 51 is moved upward and the lower electrode 52 is moved downward, so that the stranded wire 24 after the fastening step is able to move (shown by reference numeral 35c in FIG. 4). By repeating this movement, it is possible to fasten the plurality of element wires in the parallel portions 22 of the stranded wire 23.

In the foregoing, the case is explained where heat caulking was used to fasten the plurality of element wires in the parallel portions 22. However, in this embodiment, TIG (tungsten inert gas) welding, ultrasonic joining, soldering and so on may be used other than heat caulking.

Figure 5:
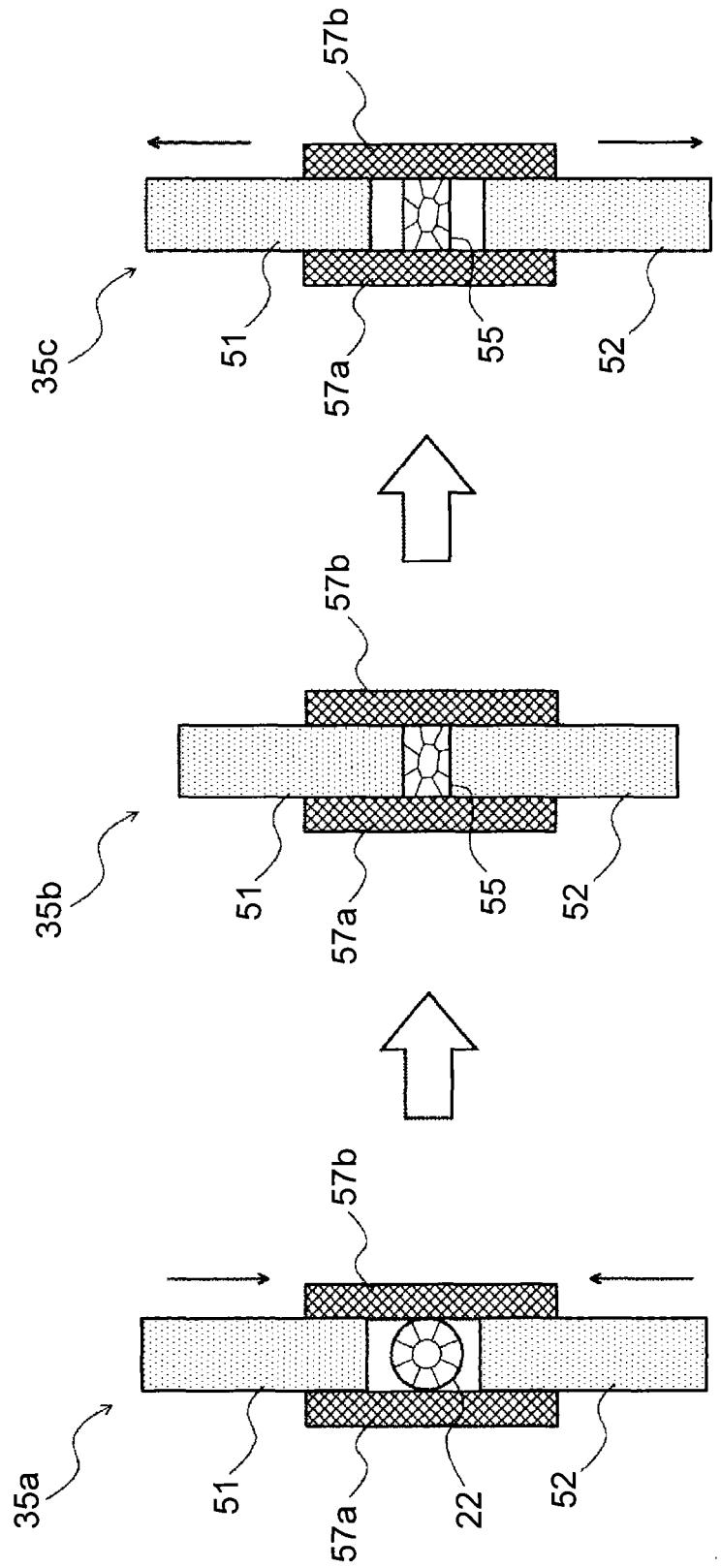
FIG. 5 is a sectional view for explaining another example of the fastening step.

FIG. 5 is a sectional view for explaining another example of the fastening step. In this embodiment, flat plate-shaped members 57a, 57b may also be provided on side surfaces of the upper electrode 51 and the lower electrode 52. By providing the flat plate-shaped members 57a, 57b as stated above, it is possible to perform heat caulking while surrounding the parallel portion 22 from all quarters by the upper electrode 51, the lower electrode 52, and the flat plate-shaped members 57a, 57b. Thus, when a part of the element wires in the parallel portion 22 is melted, it is possible to prevent molten metal from oozing out. The rest of the structure of the fastening step shown in FIG. 5 is similar to that of the case of the fastening step shown in FIG. 4, and duplicated explanation is thus omitted.

As shown in FIG. 1, the stranded wire 24 after the fastening step is conveyed to rolling mill rolls 36, 37. The rolling mill rolls 36 roll the stranded wire 24 preliminarily, and convey the preliminarily rolled stranded wire 25 to the rolling mill rolls 37. The rolling mill rolls 37 roll the preliminarily rolled stranded wire 25 and form a rectangular conductor 26 (step S5).

Figure 6:
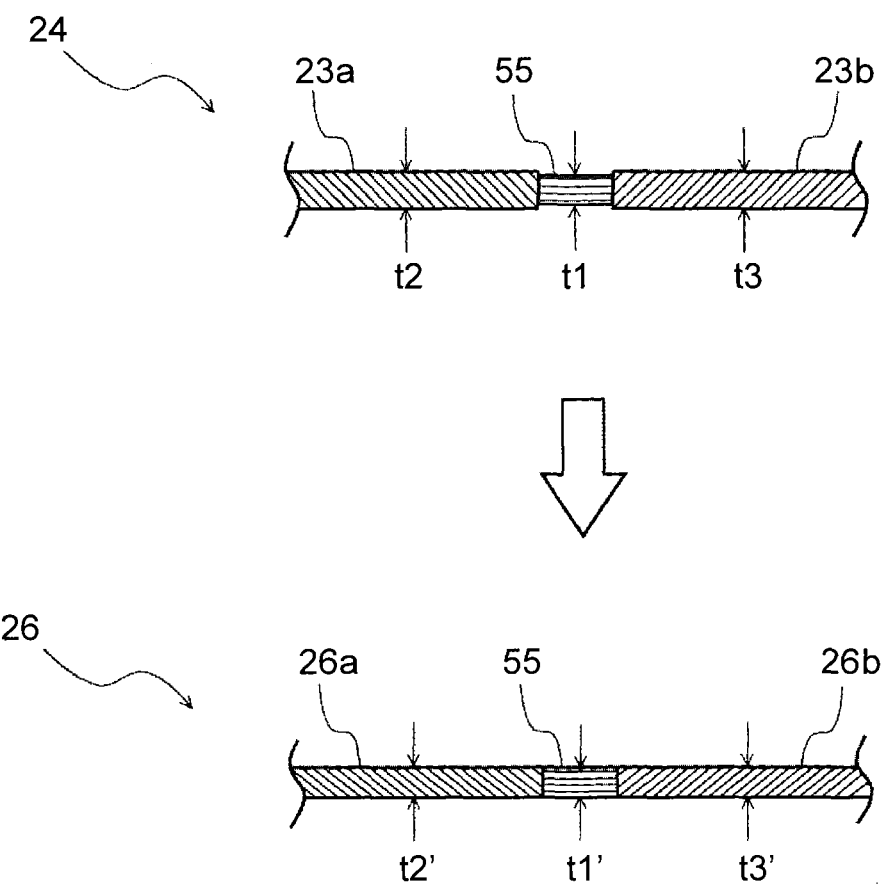
FIG. 6 is a side view showing a stranded wire before a rolling step and a rectangular conductor after the rolling step.

As shown in FIG. 6, the fastened portion 55 of the stranded wire 24 after the fastening step is compressed by using the fastening mechanism 35 (see FIG. 4). Therefore, a thickness t1 of the fastened portion 55 is smaller than a thickness t2 of the left-winding portion 23a and a thickness t3 of the right-winding portion 23b. Here, the thicknesses t1, t2, t3 are thicknesses in a moving direction of the upper electrode 51 and the lower electrode 52 in FIG. 4 (in short, a up and down direction). In the rolling step, the rectangular conductor 26 is formed by rolling the stranded wire 24 by using the rolling mill rolls 36, 37. At this time, since the left-winding portion 23a and the right-winding portion 23b of the stranded wire 24 are compressed, the thickness t1' of the fastened portion 55, a thickness t2' of the left-winding portion 26a, and a thickness t3' of the right-winding portion 26b are generally the same in the rectangular conductor 26 after rolling as shown in FIG. 6. Therefore, it is possible to form the rectangular conductor 26 without steps (or with little steps).

Meanwhile, when the parallel portion 22 is compressed too much in the fastening step (step S4), the thickness t1 of the fastened portion 55 becomes too small, and a difference between the thickness t1' of the fastened portion 55 of the rectangular conductor 26 after the rolling step, and the thicknesses t2', t3' of the left-winding portion 26a and the right-winding portion 26b becomes large. In this case, the rectangular conductor 26 with steps is formed. Therefore, in the manufacturing method for a segment coil according to this embodiment, it is necessary not to compress the parallel portion 22 too much in the fastening step (step S4). In other words, the parallel portion 22 is fastened so that the thickness t1 ' of the fastened portion 55 after the plurality of element wires in the parallel portion 22 is fastened becomes generally the same as the thicknesses t2', t3' of the portions other than the fastened portion 55 (the left-winding portion 26a and the right-winding portion 26b) after the rectangular conductor 26 is formed by rolling the stranded wire 24.

Thereafter, as shown in FIG. 1, the rectangular conductor 26 is conveyed to a heating furnace 38, the rectangular conductor 26 is heated, and an oxide film 15 is formed on surfaces of the central element wire 12 and each of the peripheral element wires 13 that structure the rectangular conductor 26 (step S6). In other words, since the central element wire 12 and each of the peripheral element wires 13, which structure the rectangular conductor 26, are made of a metallic material, a metal oxide film is formed on the surfaces of the central element wire 12 and each of the peripheral element wires 13 by heating the rectangular conductor 26. For example, in the case where copper is used to structure the central element wire 12 and each of the peripheral element wires 13, copper oxide is formed as the oxide film 15. By forming the oxide film 15 on the surfaces of the central element wire 12 and each of the peripheral element wires 13, which structure the rectangular conductor 26, it is possible to improve insulation property between the element wires. The rectangular conductor 27, in which the oxide film 15 is formed, is conveyed to a cover forming part 39.

The cover forming part 39 forms an insulation layer 16 on an outer periphery of the rectangular conductor 27 in which the oxide film 15 is formed, thereby forming the rectangular conductor 28 (step S7). The cover forming part 39 is provided with a hollow-shaped hollow portion 45 extending in the conveying direction of the rectangular conductor 27. A sectional shape of the hollow portion 45 is a rectangular shape. In the hollow portion 45, a resin material for forming the insulation layer is filled. In other words, the rectangular conductor 27 passes through the hollow portion 45 in which the resin material is filled. Thus, the insulation layer 16 is formed on the outer periphery of the rectangular conductor 27.

The cover forming part 39 shown in FIG. 1 is an example only, and, in this embodiment, the cover forming part 39 having a structure other than the above-mentioned structure may be used. The material for forming the insulation layer 16 is not limited to the resin material, and any other material may be used as long as the material has insulation property (for example, an enamel material).

Figure 7:
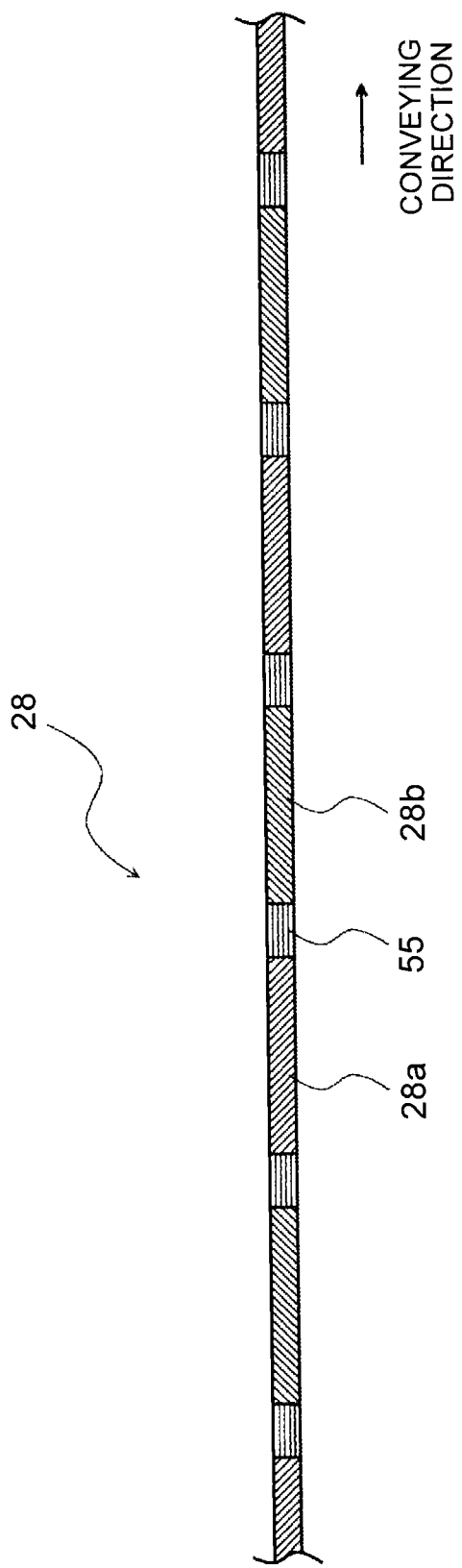
FIG. 7 is a side view showing the rectangular conductor formed by using the manufacturing method for a segment coil according to the embodiment.

The rectangular conductor 28 fabricated in the foregoing method is shown in FIG. 7. In FIG. 7, the insulation layer 16, which is formed around the rectangular conductor 28, is not shown. As shown in FIG. 7, by using the manufacturing method for a segment coil according to this embodiment, it is possible to form the rectangular conductor 28 in which the right-winding portion 28b, the fastened portion 55 (corresponding to the parallel portion 22), the left-winding portion 28a, the fastened portion 55, the right-winding portion 28b, . . . are lined up continuously in this order from the downstream side of the conveying direction toward the upstream side of the conveying direction.

Next, a segment coil forming step (step S8 in FIG. 2) is explained. FIG. 8 is a view for explaining the segment coil forming step. In FIG. 8, the insulation layer 16, which is formed around the rectangular conductor 28, is not shown either. As shown in FIG. 8, the segment coil 60 has a U shape, and is provided with a curved portion 61, shoulder portions 62a, 62b, linear portions 63a, 63b, and coil end portions 64a, 64b.

When forming the segment coil 60, the rectangular conductor 28 is first cut at a cutting position 59. The cutting position 59 is a center part of the fastened portion 55. By setting the center part of the fastened portion 55 as the cutting position 59 as stated above, the fastened portion 55 is able to structure the coil end portions 64a, 64b of each of the segment coils 60. For example, a width (a length in the conveying direction) of the fastened portion 55 may be a double or more of a length of each of the coil end portions 64a, 64b.

After cutting the rectangular conductor 28, the insulation layer 16 is peeled off at the positions where the coil end portions 64a, 64b are formed. Thereafter, the rectangular conductor 28 is bent, thereby forming the segment coil 60 shown in FIG. 8. The segment coil 60 shown in FIG. 8 is structured from the fastened portions 55 and the right-winding portion 28b. Other segment coil may be structured from the fastened portions 55 and the left-winding portion 28a.

For example, when changing a size (a length) of the segment coil 60, positions for the gripping portions 41a to 41c in the twisting mechanism 34 are adjusted so that the coil end portions 64a, 64b of the segment coil 60 are formed in the fastened portions 55 of the rectangular conductor 28. In other words, the positions gripped by the gripping portions 41a to 41c become the fastened portions 55, and, when cutting the rectangular conductor 28, the rectangular conductor 28 is cut so that the positions gripped by the gripping portions 41a to 41c become coil end portions 64a, 64b of the segment coils 60.

Figure 9:
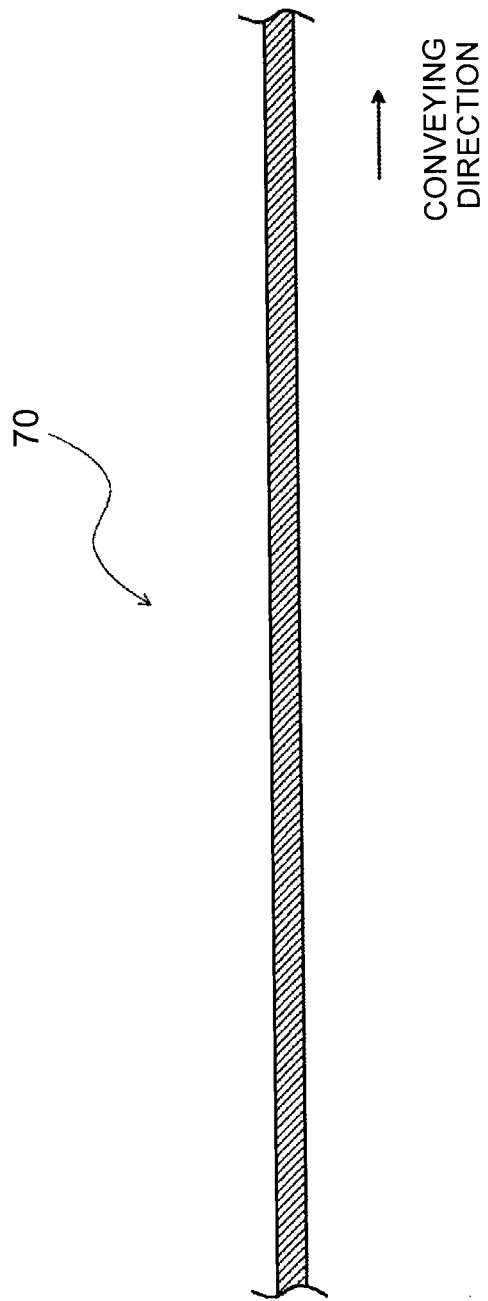
FIG. 9 is a side view showing a rectangular conductor formed by using another manufacturing method for a segment coil according to the embodiment.

In the manufacturing method for the segment coil according to the embodiment shown in FIG. 1, the case is explained where the assembled wire 21 is gripped by using the gripping portions 41a to 41c, and then the gripping portion 41b in the middle among gripping portions 41a to 41c is rotated about the central axis of the assembled wire 21 when forming the stranded wire 23. However, in this embodiment, the stranded wire may be formed by twisting the assembled wire 21 continuously in one direction about the central axis of the assembled wire 21. In this case, a stranded wire 70 twisted continuously in one direction is formed like the stranded wire 70 shown in FIG. 9 (FIG. 9 shows a stranded wire twisted in the counterclockwise direction in a view from the downstream side of the conveying direction). In short, the stranded wire 70 does not include the parallel portions 22.

Figure 10:
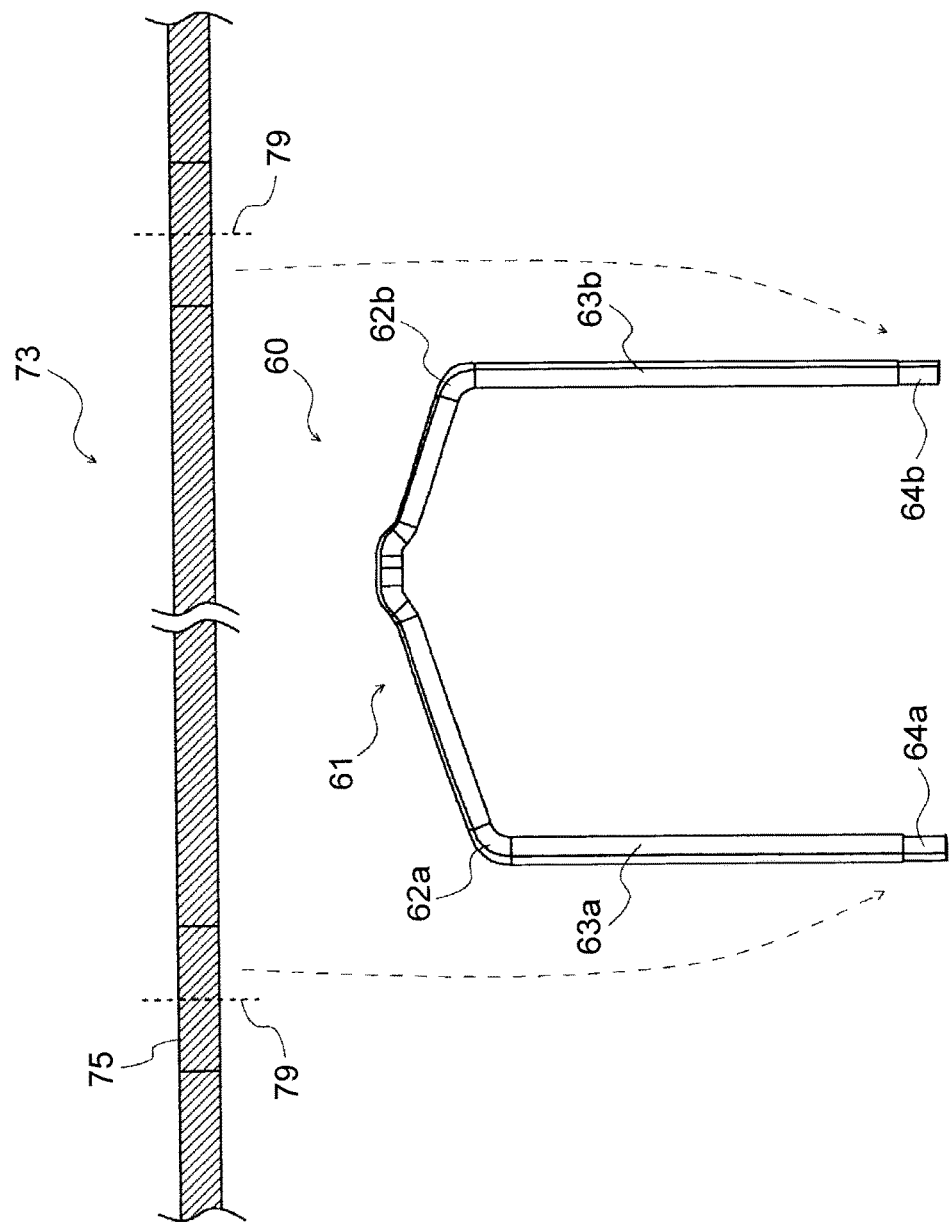
FIG. 10 is a view for explaining a segment coil forming step.

When carrying out the fastening step (step S4) for the stranded wire 70 shown in FIG. 9, the fastening mechanism 35 fastens a plurality of element wires, out of the element wires of the stranded wire 70, at positions where the coil end portions 64a, 64b of the segment coil 60 are formed. Thus, in a rectangular conductor 73 shown in FIG. 10, fastened portions 75 are formed at positions where the coil end portions 64a, 64b of the segment coils 60 are formed. In this case, the coil end portions 64a, 64b of each of the segment coils 60 are also structured in the fastened portions 75 by cutting the rectangular conductor 73 at cutting positions 79.

In the manufacturing method for a segment coil according to this embodiment shown in FIG. 1 and FIG. 2, the case is described as an example where the fastening step (S4) is carried out before the rolling step (S5) after the stranded wire forming step (S3). However, the fastening step (S4) may be carried out at any timing but only before the segment coil forming step (S8) in which the rectangular conductor is bent (and preferably after the stranded wire forming step (S3)).

As explained in the background art, in recent years, a motor is widely used in which segment coils are used as coils that structure a stator of the motor. In the case where the segment coils are used as coils that structure the stator of the motor, the plurality of U-shaped segment coils are arrayed into a circular shape in the stator core, and the plurality of segment coils are electrically connected with each other. At this time, in order to connect the plurality of coil end portions of the segment coils with each other by welding and so on, it is necessary to bend the segment coils so that the plurality of coil end portions are brought closer to each other.

Figure 11:
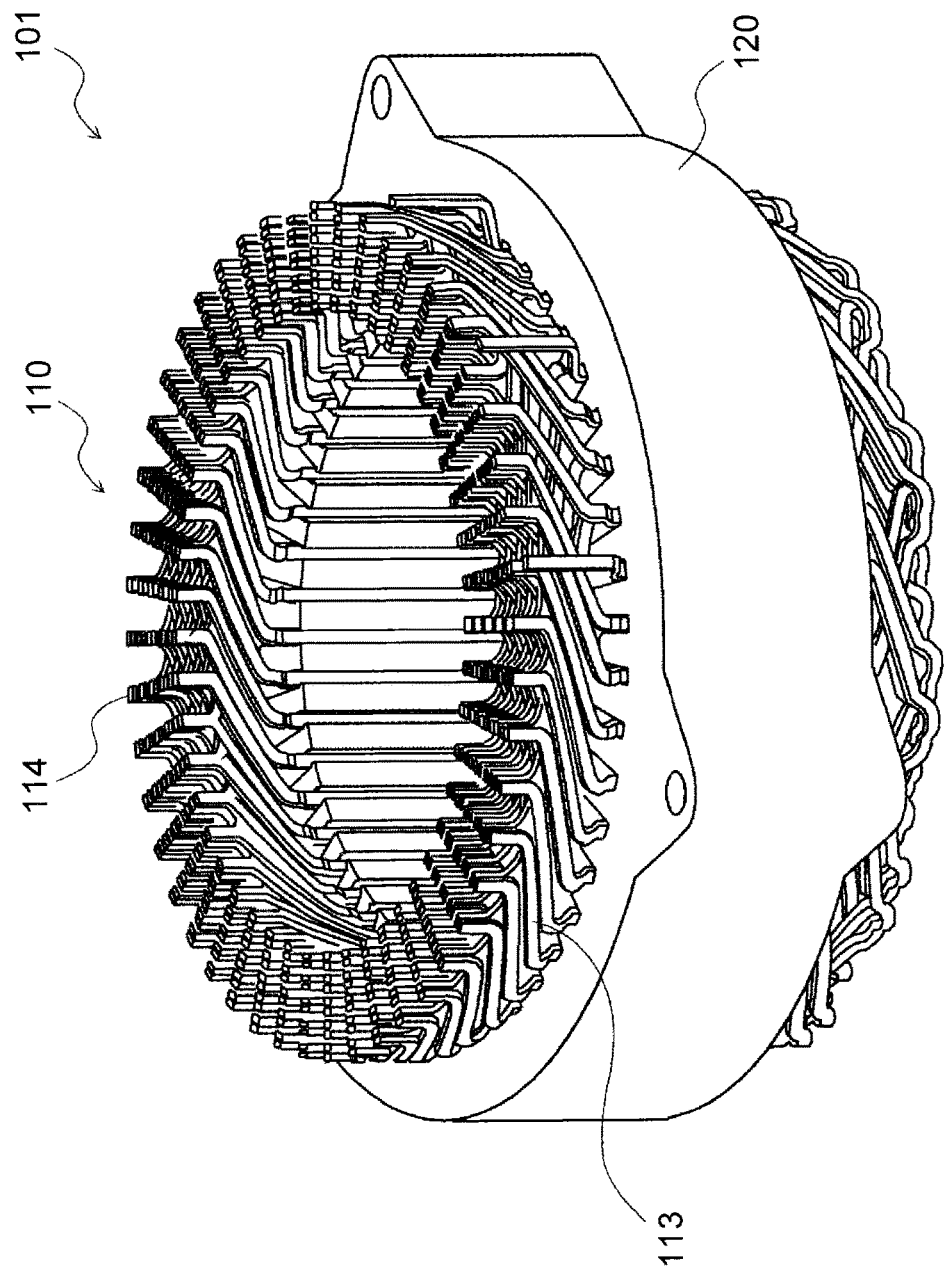
FIG. 11 is a perspective view showing a state where the segment coils are arranged in a stator core.

FIG. 11 is a perspective view showing a state where the segment coils are arranged in a stator core. As shown in FIG. 11, a stator 101 is formed by inserting the plurality of segment coils 110 in each slot of the stator core 120. In this case, the plurality of segment coils 110 is arranged from an inner periphery side to an outer periphery side of the stator core 120 within one slot. Liner portions 113 of the segment coils 110 are bent along a circumferential direction of the stator core 120.

Figure 12:
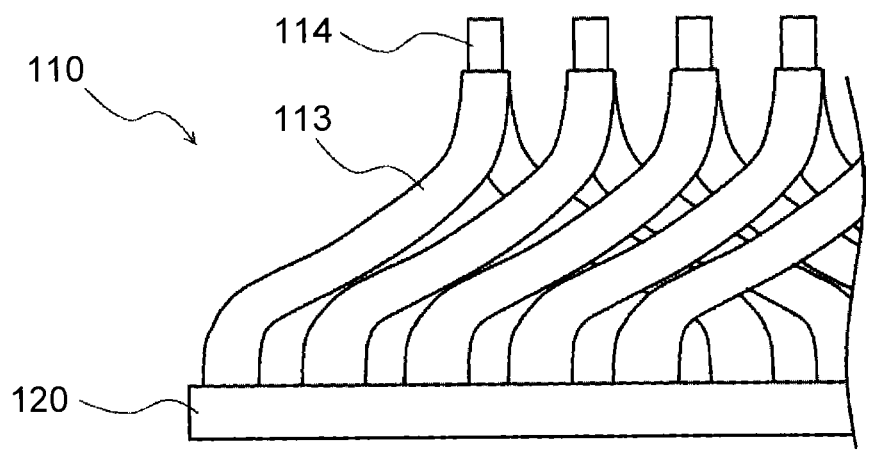
FIG. 12 is a front view showing a state where a plurality of coil end portions of the segment coils is connected with each other.

This means that, as shown in FIG. 12, it is necessary to bend the linear portions 113 of the segment coils 110 in order to connect the plurality of coil end portions 114 of the segment coils 110 with each other by welding and so on.

However, because the segment coil 110 is a coil formed by assembling the plurality of element wires (conductors), the element wires in the coil end portion 114 come apart when the segment coil 110 is bent, and it could thus be difficult to connect the plurality of coil end portions 114 with each other by welding and so on. Namely, when the segment coil 110 is bent, a difference is produced in stress applied to the segment coil 110 between an inner side and an outer side of the bent portion. Therefore, the element wires in the coil end portion 114 come apart.

In the manufacturing method for a segment coil according to this embodiment, before the segment coil is formed by bending the rectangular conductor, the plurality of element wires is fastened at positions where the coil end portions are formed. By fastening the plurality of element wires at the positions where the coil end portions are formed before bending the rectangular conductor, it is possible to prevent the element wires in the coil end portion from coming apart even when the rectangular conductor is bent.

In particular, in the manufacturing method for a segment coil according to this embodiment, the plurality of element wires is fastened at the positions where the coil end portions of the segment coil are formed before forming the rectangular conductor by rolling the stranded wire (in short, before the rolling step in step S5). Thereafter, the stranded wire is rolled. Thus, it is possible to make thicknesses of the fastened portion and portions other than the fastened portion generally equal. Hence, it is possible to form the rectangular conductor without steps (or with little steps).

After gripping the assembled wire 21 by using the gripping portions 41a to 41c, the gripping portion 41b in the middle among gripping portions 41a to 41c is rotated about the central axis of the assembled wire 21, and the stranded wire 23 is thus formed. In this case, the parallel portion 22 is formed, in which the assembled wire 21 is not twisted. As the parallel portion 22 is arranged at the coil end portion of the segment coil, the element wires, in particular, come apart easily. In this embodiment, by fastening the plurality of element wires in the parallel portion 22, it is possible to effectively prevent the element wires in the coil end portion from coming apart even when the parallel portion 22 is arranged at the coil end portion.

With the invention according to the embodiment described above, it is possible to provide a manufacturing method for a segment coil, by which the element wires in the coil end portion are prevented from coming apart.

The invention has been explained so far based on the foregoing embodiment. However, the invention is not limited to the structure of the above embodiment, and it is obvious that various modifications, amendments, and combinations, which can be made by a person skilled in the art, are included in the invention without departing from the scope of the invention claimed herein.

What is claimed is:

1. A manufacturing method for a segment coil, comprising:
    forming an assembled wire by bundling a plurality of element wires;
    forming a stranded wire by twisting the assembled wire;
    forming a rectangular conductor by rolling the stranded wire; and
    forming a segment coil by cutting the rectangular conductor into a given length and bending the cut rectangular conductor, wherein
    the plurality of element wires is fastened at a position where a coil end portion of the segment coil is formed before bending the rectangular conductor,
    when forming the stranded wire, the assembled wire is gripped at three locations separated from each other in a central axis direction of the assembled wire, and a gripping portion in the middle among three gripping portions that grip the assembled wire is rotated about a central axis of the assembled wire,
    when fastening the plurality of element wires, the plurality of element wires is fastened at a position gripped by the gripping portion, and
    when cutting the rectangular conductor, the rectangular conductor is cut so that the coil end portion of the segment coil is formed at the position gripped by the gripping portion.

2. The manufacturing method for a segment coil according to claim 1, wherein the plurality of element wires is fastened at the position where the coil end portion of the segment coil is formed before the rectangular conductor is formed by rolling the stranded wire.

3. The manufacturing method for a segment coil according to claim 1, wherein
the plurality of element wires is fastened at the position where the coil end portion of the segment coil is formed after the stranded wire is formed by twisting the assembled wire.

4. The manufacturing method for a segment coil according to claim 1, wherein
the rectangular conductor includes a left-winding portion, which is twisted in a counterclockwise direction in a view from a downstream side of a conveying direction of the rectangular conductor, a right-winding portion, which is twisted in a clockwise direction in the view from the downstream side of the conveying direction of the rectangular conductor, and a parallel portion in which the plurality of element wires is parallel to one another,
the plurality of element wires in the parallel portion is fastened when fastening the plurality of element wires, and
the rectangular conductor is cut so that the coil end portion of the segment coil is formed in the parallel portion, when cutting the rectangular conductor.

5. The manufacturing method for a segment coil according to claim 1, wherein
when the plurality of element wires is fastened, the plurality of element wires is sandwiched between an upper electrode and a lower electrode, an electric current is flown between the upper electrode and the lower electrode, and pressure is applied to the plurality of element wires by using the upper electrode and the lower electrode, thereby performing heat caulking.

6. The manufacturing method for a segment coil according to claim 1, wherein
when fastening the plurality of element wires, heat caulking is performed while surrounding the plurality of element wires by using a given member from all quarters of a section that is perpendicular to a direction in which the stranded wire extends.

7. The manufacturing method for a segment coil according to claim 1, wherein
the plurality of element wires includes a central element wire having a circular sectional shape and peripheral element wires each having a trapezoidal sectional shape.

\* \* \* \* \*